US005669648A

United States Patent [19]
Luck

[11] Patent Number: 5,669,648
[45] Date of Patent: Sep. 23, 1997

[54] POST HOLE DIGGER

[76] Inventor: Michael Lewis Luck, P.O. Box 4433, Flint, Mich. 48504

[21] Appl. No.: 675,460

[22] Filed: Jun. 12, 1996

[51] Int. Cl.⁶ ............................................. A01B 1/18
[52] U.S. Cl. ........................... 294/50.8; 294/59; 294/60
[58] Field of Search ......................... 294/49, 50.6, 50.7, 294/50.8, 51, 57, 59, 60; 111/101, 106, 107

[56] References Cited

U.S. PATENT DOCUMENTS

| | | | |
|---|---|---|---|
| 199,501 | 1/1878 | Bowman | 294/50.8 |
| 456,655 | 7/1891 | Kohler | 294/50.8 |
| 1,548,040 | 8/1925 | Johnson | 294/60 |
| 2,028,680 | 1/1936 | Mayeda et al. | 294/60 |
| 2,598,288 | 5/1952 | Navarre | 294/50.8 |
| 2,710,765 | 6/1955 | Arens | 294/50.6 |
| 4,042,270 | 8/1977 | Weiland | 294/50.8 |
| 5,077,917 | 1/1992 | Lacey et al. | 294/49 |
| 5,273,331 | 12/1993 | Burnham | 294/50.8 |
| 5,478,128 | 12/1995 | Aaland | 294/50.8 |
| 5,558,378 | 9/1996 | Byrd | 294/50.8 |

FOREIGN PATENT DOCUMENTS 43860  9/1910  Austria ............................. 294/50.8

*Primary Examiner*—Dean Kramer
*Attorney, Agent, or Firm*—Goldstein & Associates

[57] ABSTRACT

An improved post hole digger which comprises a plurality of elongated arm members having a proximal end and a distal end and an inner surface and an outer surface. A sharpened shovel blade is secured to the distal end of each of the elongated arm members, and a hinge pivotally secures the sharpened shovel blades to each other. A detachable top plate assembly is affixed to the proximal end of the elongated arm members and allows a user to strike the improved post hole digger with a weighted object such as a sledge hammer in order to drive the sharpened shovel blades into the ground. A handle bar is secured perpendicular to the outer surface of each elongated arm member at the proximal end of the elongated arm member, and a foot peg is secured perpendicular to the outer surface of each elongated arm member at the distal end, thus allowing a user to alternatively drive the sharpened shovel blades into the ground by holding the improved post hole digger by the handle bars so that the sharpened shovel blades point into the ground, and then jumping upon the foot pegs.

10 Claims, 2 Drawing Sheets

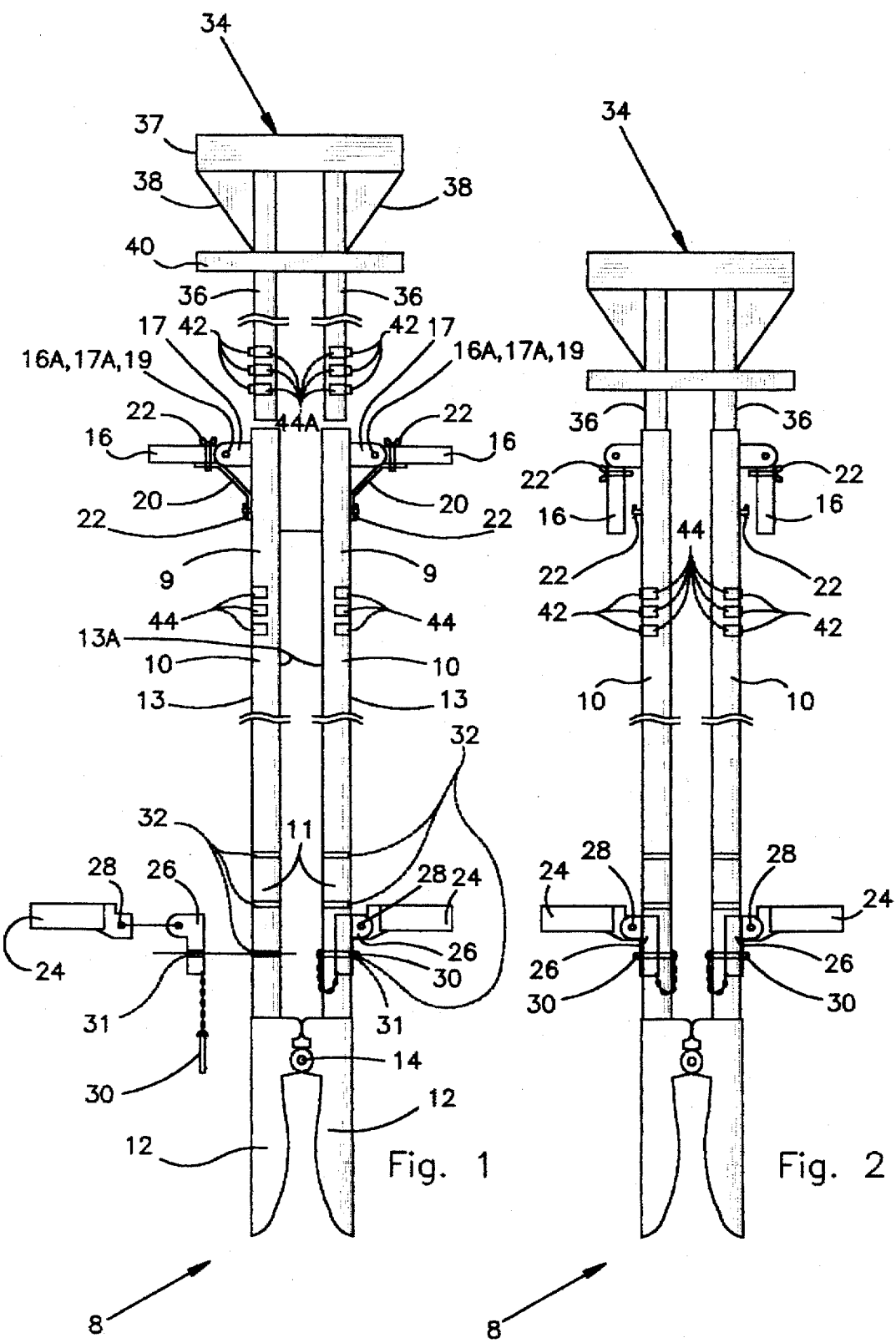

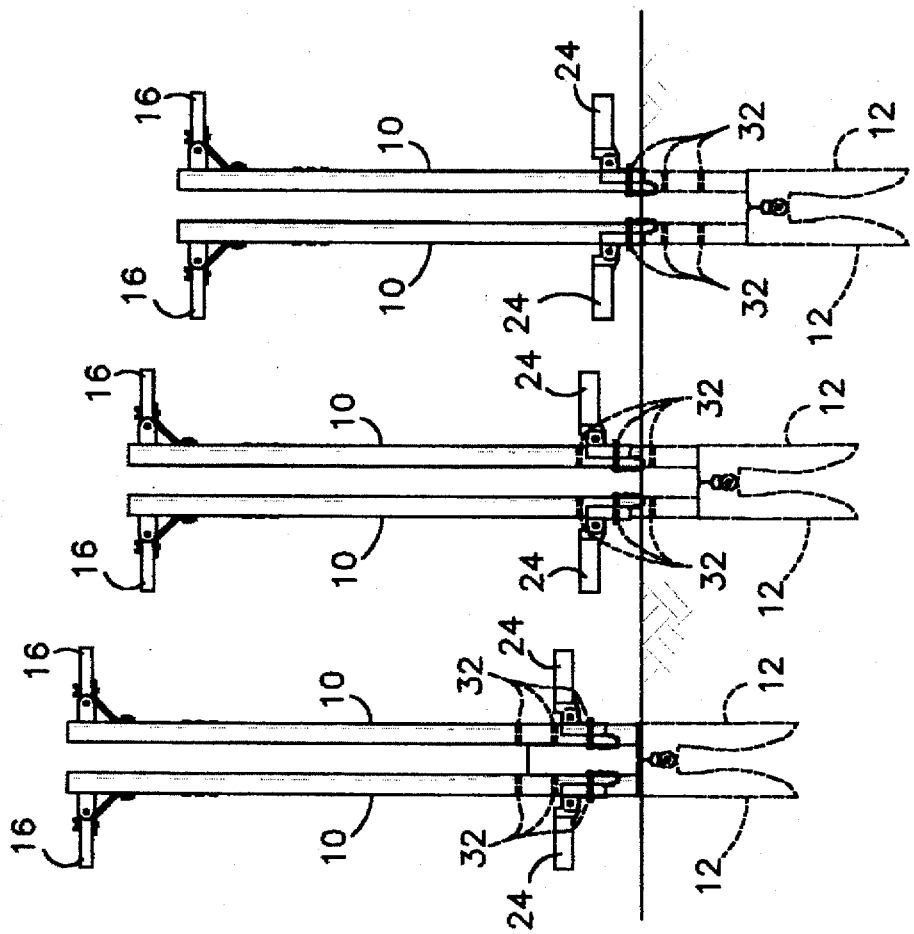
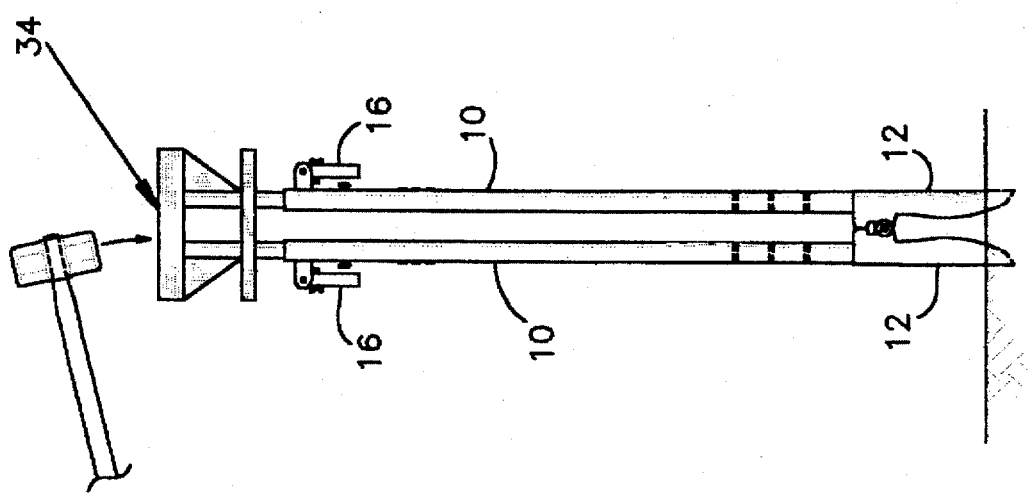

POST HOLE DIGGER

BACKGROUND OF THE INVENTION

The invention relates to a new and improved post hole digger. More particularly, the invention relates to an improved clam shell type post hole digger which permits a user to more conveniently and effortlessly produce a lateral hole in the ground surface for receiving a post or similar elongated object.

Typical embodiments of clam shell type post hole diggers found in the art comprise two arm members which are pivotally secured adjacent to one another near the distal end of each arm member. A sharpened shovel blade is mounted at the distal end of each arm member. In order to produce a "post hole" in the ground surface, a user must grasp each of the arm members, lift the assembly vertically into the air as high as possible, and then thrust the entire assembly downward towards the ground surface so that the sharpened shovel blades which are mounted to the distal ends of the arm members strike, break, and penetrate the ground surface.

Upon the sharpened shovel blades being driven into the ground surface, the arm members are then spread apart such that the sharpened shovel blades are drawn together about their axis of pivotal securement, thus causing the sharpened shovel blades to enclose and grasp a bite of ground. The bite of ground is then lifted away by pulling the arm members upward and removing the sharpened shovel blades from the ground surface. The enclosed sharpened shovel blades are then positioned above an adjacent area, and the arm members are brought together so that the bite of dirt is released from the grasp of the sharpened shovel blades. This process is repeated continuously until the desired depth of the hole is attained.

Various disadvantages are inherent in this typical clam shell type post hole digger. Commonly, a user is incapable of thrusting the sharpened shovel blades sufficiently deep into the ground surface because the user is unable to firmly grasp the smooth and vertical arm members of the apparatus. In attempting to attain enough penetration of the ground surface to remove a substantial amount of ground therefrom, the user also finds that his or her hands chafe against the arm members and become blistered and callused. Furthermore, because the user must extend his or her arms horizontally and then lift the apparatus, via the arm members, upward in a most un-ergonomic manner, severe back strain is common. It is also extremely difficult to produce enough driving force to adequately penetrate the ground surface in areas where great amounts of clay and other hard, non-porous compositions are present. These prior-art devices do not permit a user to employ more powerful means of penetration such as utilizing his leg muscles (which are typically stronger than arm and back muscles) to thrust the apparatus downward, or striking the top of the apparatus with a heavy weighted tool to drive it downward.

Indicative of these less than suitable, standard post hole diggers are U.S. Pat. No. 2,598,288 to Navarre and U.S. Pat. No. 5,273,331 to Burnham, both of which possess the typical smooth, elongated arm members which lack adequate grasping means to assist the user in forcefully penetrating the ground surface. U.S. Pat. No. 5,478,128 to Aaland discloses a spring operated clam shell type post hole digger which is complex in both design and operation. While these units may be suitable for the particular purpose employed, or for general use, they would not be as suitable for the purposes of the present invention as disclosed hereafter.

SUMMARY OF THE INVENTION

It is an object of the invention to produce an improved post hole digger which provides a user with a more convenient and effective manner of penetrating a ground surface in order to produce a lateral hole in the ground for receiving a post hole or similar elongated object.

It is another object of the invention to provide an improved post hole digger which allows a user to utilize his leg muscles and body weight to drive a post hole digger downward by jumping upon a pair of foot pegs located near the distal end of the apparatus.

It is a further object of the invention to produce an improved post hole digger which possesses a detachable top plate which, when secured to the proximal end of the post hole digger, allows a user to strike said top plate with a heavy weighted object such as a sledge hammer in order to drive a pair of sharpened shovel blades which are mounted to the distal end of the apparatus into the ground.

It is a still further object of the invention to provide an improved post hole digger which has collapsible and removable foot pegs and handlebars such that the device may be conveniently stored in confined areas.

The invention is an improved post hole digger which comprises a plurality of elongated arm members having a proximal end and a distal end and an inner surface and an outer surface. A sharpened shovel blade is secured to the distal end of each of the elongated arm members, and a hinge pivotally secures the sharpened shovel blades to each other. A detachable top plate assembly is affixed to the proximal end of the elongated arm members and allows a user to strike the improved post hole digger with a weighted object such as a sledge hammer in order to drive the sharpened shovel blades into the ground. A handle bar is secured perpendicular to the outer surface of each elongated arm member at the proximal end of said elongated arm member, and a foot peg is secured perpendicular to the outer surface of each elongated arm member at the distal end. These features allow a user to alternatively drive the sharpened shovel blades into the ground by holding the improved post hole digger by the handle bars so that the sharpened shovel blades point into the ground, and then jumping upon the foot pegs.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a diagrammatic perspective view of an improved post hole digger showing an attachable top plate and adjustable foot pegs.

FIG. 2 is a diagrammatic perspective view of the improved post hole digger showing the attachable top plate in place and a pair of collapsed handle bars.

FIG. 3 is a diagrammatic perspective view of the improved post hole digger with the attachable top plate in place.

FIG. 4 is a diagrammatic perspective view of the improved post hole digger being driven progressively deeper into the ground with a sledge hammer.

DETAILED DESCRIPTION OFF THE PREFERRED EMBODIMENTS

FIG. 1 illustrates an improved post hole digger 8 comprising two elongated arm members 10. Each elongated arm member 10 has a proximal end 9 and a distal end 11, as well as an outer surface 13 and an inner surface 13A. A sharpened shovel blade 12 is mounted at the distal end 11 of each of the elongated arm members 10. Said sharpened shovel blades 12 are joined together with a hinge 14 which acts as an axis of pivotal securement and allows the sharpened shovel blades 12 to be drawn together or spread apart in response to movement of the elongated arm members 10 toward or away from each other. The elongated arm members 10 are primarily hollow at the proximal end 9 for reasons which will become apparent hereafter.

A flange 17 having a flange aperture 17A is attached to the outer surface 13 of the proximal end 9 of each of the arm members 10. A handle bar 16 having a handle bar aperture 16A extends from each of the flanges 17 perpendicular to the elongated arm members 10, and is secured to the flange 17 with a pin 19 which extends through the aligned apertures 17A and 16A. A brace 20 reinforces each of the handle bars 16. Said brace 20 is attached diagonally to each of the elongated arm members 10 and the handle bars 16 with bolt/wing nut assemblies 22, as seen in FIGS. 1 and 2. By removing the bolt/wing nut assemblies 22 and hence removing the brace 20 from its engagement to the handle bar 16 and elongated arm member 10, the handle bars 16 can be collapsed and pivoted downward about the pin 19, so that they are situated adjacent and parallel to the elongated arm members 10, as seen in FIG. 2.

A foot peg 24 is attached to the outer side of the distal end 11 of each of the elongated arm members 10 by means of a collar 26 having a collar aperture 31. The foot pegs 24 are perpendicular to the elongated arm members 10. Each foot pegs 24 is attached to each collar 26 by means of a rivet or similar fastener which extends through aligned apertures 28 on the foot peg 24 and the collar 26 as illustrated in FIG. 1 and FIG. 2. Accordingly, said foot pegs 24 are pivotal about the axis of the aperture 28 and fastener which is secured therein. A collar pin 30 then secures each collar 26 to each elongated arm member 10 by extending through the collar aperture 31 and engaging one of a plurality of bores 32 which extend through each elongated arm member 10 at the distal end and act as individual pin receptacles for accepting the collar pins 30. The height of the foot pegs 24 can be adjusted by sliding the collars 26 and foot pegs 24 up or down along the elongated arm members 10 as desired. The collar 26 is then secured to a particular point along the elongated arm members 10 by inserting the collar pin 30 through the collar aperture 31 and into one of the bores 32, as illustrated in FIG. 4.

An individual using the improved post hole digger 8 can utilize his body weight in driving the sharpened shovel blades 12 into the ground by securing and grasping the extended handlebars 16, initially locking the foot pegs 24 at the lowest possible height, and then jumping upon the foot pegs 24 with the user's feet. As the improved post hole digger 8 is driven deeper into the ground, the foot pegs 24 must be adjusted to avoid their unwanted contact with the ground as depicted in FIG. 4. As the sharpened shovel blades 12 reach a depth which causes them to be fully and significantly embedded beneath the surface of the ground, the pivoting action of the sharpened shovel blades 12 via the elongated arm members 10 is employed to grasp a substantial bite of dirt. The bite of dirt is then lifted away by pulling the elongated arm members 10 upward and removing the sharpened shovel blades 12 from the ground surface. The enclosed sharpened shovel blades 12 are then positioned above an adjacent area, and the elongated arm members 10 are brought together so that the bite of dirt is released from the grasp of the sharpened shovel blades 12. This process is repeated continuously, adjusting the height of the foot pegs 24 each time as needed, until the desired depth of the hole is attained.

Referring back to FIG. 1, a top plate assembly 34 is shown. The top plate assembly 34 comprises two elongated pistons 36, a striking plate 37, a top plate brace 38 and a reinforcement bar 40. The reinforcement bar 40 is attached across the pistons 36 directly below the top plate braces 38. A plurality of notches 44 are hollowed out of each of the elongated arm members 10, and notches 44A of corresponding size and spacing interval are also disposed along the pistons 36. The pistons 36 fit into the hollow space located at the proximal end 9 of the elongated arm members 10. When the pistons 36 are inserted into this hollow space, the plurality of notches 44A of the pistons 36 are aligned with the plurality of notches 44 of the elongated arm members 10, top plate fasteners 42 such as spring loaded ball bearing pins are inserted through the aligned notches 44 and 44A, thus securing the top plate assembly 34 to the elongated arm members 10, as illustrated in FIGS. 2 and 3. The top plate assembly 34, once secured to the improved post hole digger 8, allows a user to strike the striking plate 37 with a heavy weighted object, such as a sledge hammer, in order to drive the sharpened shovel blades 12 into the ground, as illustrated in FIG. 3. Upon successive blows to the top plate assembly 34 with the weighted object, the improved post hole digger 8 is driven progressively deeper into the ground. When the sharpened shovel blades 12 reach a depth which causes them to be fully and significantly embedded beneath the surface of the ground, the top plate assembly 34 is removed, and the pivoting action of the sharpened shovel blades 12 via the elongated arm members 10 is employed to grasp a substantial bite of dirt and remove it as discussed above. This process is repeated until a hole of desired depth is produced.

What is claimed is:

1. An improved post hole digger for removing a quantity of dirt from a ground surface in order to produce a narrow lateral hole thereat for receiving an elongated object such as a post, comprising:

a) a plurality of elongated arm members, each of said elongated arm members having a proximal end and a distal end, and an inner surface and an outer surface;

b) a sharpened shovel blade secured to the distal end of each of said elongated arm members;

c) a hinge which secures the sharpened shovel blades to each other and acts as an axis of pivotal securement so that said sharpened shovel blades may be drawn together or spread apart about said axis in response to movement of the elongated arm members toward or away from each other; and d) a top plate assembly affixed to the proximal end of the elongated arm members which permits a user to strike said top plate assembly with a weighted object such as a sledge hammer, thus driving the sharpened shovel blades of the improved post hole digger firmly and deeply into the ground.

2. The improved post hole digger of claim 1, wherein the top plate assembly further comprises:

a) a striking plate;

b) a reinforcement bar;

c) a plurality of pistons protruding perpendicular from the striking plate through the reinforcement bar and mating with the elongated arm members; and d) top plate braces positioned between the striking plate and the reinforcement bar for providing extra strength thereat.

3. The improved post hole digger of claim 2, wherein the proximal ends of the elongated arm members are hollow and have notches inscribed on the outer surface thereat.

4. The improved post hole digger of claim 3, wherein notches which correspond in size and spacing to the notches located on the elongated arm members are disposed along the pistons, such that when the pistons are inserted into the hollow portion of the proximal end of the elongated arm members, said notches disposed along the pistons will be aligned with the notches disposed along the elongated arm members, allowing fasteners to be inserted into said aligned notches, thus firmly securing the top plate assembly to the elongated arm members.

5. The improved post hole digger of claim 1, wherein a handle bar is secured perpendicular to the outer surface of each elongated arm member at the proximal end of said elongated arm member, and a foot peg secured perpendicular to the outer surface of each elongated arm member at the distal end, wherein a user may drive the sharpened shovel blades into the ground by holding the improved post hole digger by the handle bars so that the sharpened shovel blades point into the ground, and jumping upon the foot pegs.

6. The improved post hole digger of claim 5, wherein a flange having a flange aperture is secured to and extends perpendicular from the outer surface of the proximal end of each elongated arm member, the handle bar has a handle bar aperture and is secured pivotally to each flange with a pin which extends through the aligned apertures, and a removable brace is attached between each of the elongated arm members and the handle bar attached thereat, thus reinforcing each handle bar and allowing each handle bar to be collapsed and folded downward upon removal of the brace therefrom.

7. The improved post hole digger of claim 6, wherein a collar having a collar aperture is secured to each of the foot pegs, bores extend through and are disposed along the distal end of the elongated arm members, and a collar pin adjustably secures said foot pegs to the elongated arm members by protruding through the collar aperture of the collar and engaging one of the bores, thus allowing the height of the foot pegs to be adjusted by sliding the collar up or down along the distal end of the elongated arm member as desired and then engaging the nearest bore with the collar pin.

8. An improved post hole digger for removing a quantity of dirt from a ground surface in order to produce a narrow lateral hole thereat for receiving an elongated object such as a post, comprising:

a) a plurality of elongated arm members, each of said elongated arm members having a proximal end and a distal end, and an inner surface and an outer surface;

b) a sharpened shovel blade secured to the distal end of each of said elongated arm members;

c) a hinge which secures the sharpened shovel blades to each other and acts as an axis of pivotal securement so that said sharpened shovel blades may be drawn together or spread apart about said axis in response to movement of the elongated arm members toward or away from each other;

d) a handle bar which is secured perpendicular to the outer surface of each elongated arm member at the proximal end of said elongated arm member;

e) a foot peg secured perpendicular to the outer surface of each elongated arm member at the distal end, wherein a user may drive the sharpened shovel blades into the ground by holding the improved post hole digger by the handle bars so that the sharpened shovel blades point into the ground, and jumping upon the foot pegs; and f) a flange having a flange aperture secured to and extending perpendicular from the outer surface of the proximal end of each elongated arm member, the handle bar having a handle bar aperture and secured pivotally to each flange with a pin extending through the aligned apertures, and a removable brace attached between each of the elongated arm members and the handle bar attached thereat, thus reinforcing each handle bar and allowing each handle bar to be collapsed and folded downward upon removal of the brace therefrom.

9. The improved post hole digger of claim 8, wherein a collar having a collar aperture is secured to each of the foot pegs, bores extend through and are disposed along the distal end of the elongated arm members, and a collar pin adjustably secures said foot pegs to the elongated arm members by protruding through the collar aperture of the collar and engaging one of the bores, thus allowing the height of the foot pegs to be adjusted by sliding the collar up or down along the distal end of the elongated arm member as desired and then engaging the nearest bore with the collar pin.

10. A method for removing a quantity of dirt from a ground surface in order to produce a narrow lateral hole thereat by utilizing an improved post hole digger which comprises a plurality of elongated arm members having a proximal end and a distal end and an inner surface and an outer surface, a sharpened shovel blade secured to the distal end of each elongated arm member, a hinge which pivotally secures the sharpened shovel blades to each other, and a detachable top plate assembly affixed to the proximal end of the elongated arm members, comprising the steps of:

a) positioning the improved post hole digger perpendicular to the ground so that the sharpened shovel blades are adjacent to the ground;

b) striking the top plate assembly of the improved post hole digger with a weighted object such as a sledge hammer, thus driving the sharpened shovel blades of the improved post hole digger firmly and deeply into the ground;

c) continuing step (b) until the sharpened shovel blades have been driven adequately deep into the ground;

d) removing the detachable top plate assembly from the improved post hole digger;

e) spreading the elongated arm members apart so as to cause the sharpened shovel blades to pivot about their axis of securement and grasp a bite of dirt therebetween; and f) lifting the elongated arm members upward and removing the sharpened shovel blades from the ground surface, positioning the improved post hole digger above an adjacent area and drawing the elongated arm members together so that the bite of dirt is released from the grasp of the sharpened shovel blades.

* * * * *